United States Patent [19]
Cubit et al.

[11] Patent Number: 5,741,627
[45] Date of Patent: Apr. 21, 1998

[54] OPTICAL RECORDING MEDIUM AND METHOD FOR ELIMINATING BERM BUILDUP

[75] Inventors: Robert L. Cubit, Westminister; Bruce E. Del Mar, Laguna Beach, both of Calif.

[73] Assignee: Del Mar Avionics, Irvine, Calif.

[21] Appl. No.: 648,532

[22] Filed: May 15, 1996

[51] Int. Cl.$^6$ ............................................. G11B 7/26
[52] U.S. Cl. ................. 430/321; 430/328; 430/270.15; 430/320; 430/394
[58] Field of Search ................................ 430/321, 320, 430/394, 270.15, 328; 264/1.31, 1.33, 1.36, 1.38

[56] References Cited

U.S. PATENT DOCUMENTS

| | | | |
|---|---|---|---|
| 4,270,130 | 5/1981 | Houle et al. | 430/945 |
| 4,306,013 | 12/1981 | Roach et al. | 430/321 |
| 4,308,337 | 12/1981 | Roach et al. | 430/321 |
| 4,380,769 | 4/1983 | Thomas et al. | 430/945 |
| 4,613,966 | 9/1986 | Di Stefano et al. | 369/100 |
| 4,646,103 | 2/1987 | Sugiyama et al. | 346/1.1 |
| 4,896,313 | 1/1990 | Hirose et al. | 369/275 |
| 5,088,086 | 2/1992 | Van et al. | 369/100 |
| 5,099,469 | 3/1992 | Dobbin et al. | 369/58 |
| 5,218,591 | 6/1993 | Shimamoto et al. | 369/54 |
| 5,283,159 | 2/1994 | Norton et al. | 430/275 |
| 5,304,455 | 4/1994 | Liempe | 430/270 |

*Primary Examiner*—Martin Angebranndt
*Attorney, Agent, or Firm*—W. D. English

[57] ABSTRACT

The invention discloses a method and an apparatus for creating an optical disc master by forming pits having ideal shapes and without berm buildup. These ideally shaped pits are improvements in the technology of disc mastering, due to the manufacturing and data playback advantages that are inherent in the ideally shaped pits. A disc substrate has a very thin partially reflective layer applied to the surface of the optical disc upon which data will be recorded. The substance used to make the partially reflective layer is normally considered opaque in more commonly occurring thicknesses. However, the partially reflective layer, is created to be so extremely thin that it becomes partially optically transparent. The partially reflective layer then has spin coated, thereon, an optically active lamina to enable the recording of data on the disc by laser means in the form of pits. The pits are created by having a laser light focusing on both the partially reflective layer and the optically active lamina, both which react to the irradiation causing a pit to be formed. The resulting pit more often than not possesses a residual raised berm area surrounding the pit, in what is considered to be a less than ideal shape for a pit. The residual berm, however, is eliminated as disclosed in this application by an additional process and step of passing the recently recorded disc under a UV illumination source before application of any additional layer to the disc. An OD Master can be created by finally depositing a conductive and reflective lamina over the pitted active lamina. The invention is also useful in providing increased laser tracking. Here, the partially reflective layer provides increased signal to noise ratio, enhancing laser tracking in both the recording and playback modes.

9 Claims, 10 Drawing Sheets

OPTICAL RECORDING MEDIUM AND METHOD FOR ELIMINATING BERM BUILDUP

BACKGROUND OF THE INVENTION

1. Field of the Invention

This invention relates to the recording of data on optical discs, and more specifically toward obtaining superior laser tracking, improved pit geometry, and berm inhibition and deletion in optical recordings created within the art of optical disc mastering.

2. Description of the Prior Art

Various methods have been employed in recording data on optical discs, wherein, data is recorded by having a laser burn pits into an optical disc. Optical disc (OD) Masters are articles from which prerecorded mass produced consumer OD's are subsequently molded. The master is a first article in the OD manufacturing process having data or information recorded on a disc or platter that can be read by optical means. All subsequent OD manufacturing and duplication processes transfer that identical form, format and data from the original first article by various means including: vacuum deposition; electroforming/plating; or injection molding processes.

Past techniques for producing masters combined existing technologies from various industries. The most prominent of these techniques is the photo resist concept of the semiconductor industry. The master had formed on it a series of pits which serve to optically record information. The pits form a spiral line or track starting at a central portion of the disc and continuing to the outer periphery of the disc. Conventionally, the pits are approximately 0.6 um (10–6 meters) wide, 0.9 to 3.3. um long, 0.12 um deep, and are separated from neighborhood tracks, on either side thereof, by 1.6 um center to center.

To record using the photoresist technique, a lamina of photoresist material is spun upon a very smooth, polished circular plate of glass. The glass plate with photoresist lamina is then placed in an oven to cure the photoresist. The cured, photoresist coated, glass plate is next set upon a turntable which is caused to spin. A data modulated laser optical system is focused on the glass plate, while suspended by a relatively large and complex translational mechanism, to cause the focused spot laser to move very gradually, at a steady radial rate, outwardly from the center of the spinning glass plate while concomitantly radiating the surface of the plate. The affect being to produce a spiral track of data in the photoresist material. The turntable spins at either a constant angular velocity or a constant linear velocity (CLV) while any point on the surface of the plate is being radiated by a laser. This process is referred to as mastering, wherein, data is recorded by creating pits in the optical disc from the exposure to laser light along the spiral path as the plate rotates. After the desired data has been recorded in the photoresist lamina, the plate is placed in at least one bath of developing solution, typically a process that requires multiple steps, whereby, the exposed areas in the photoresist are etched out leaving a series of pits. The glass plate with etched photoresist is then oven dried, followed by metalization of the photoresist lamina by vacuum deposition of a thin conductive lamina of metal thereon, which yields the desired master. The master is finally subjected to an analysis and validation process prior to electroforming to make a stamper and replication.

The foregoing type of mastering system is quite expensive in terms of capital equipment involved, labor, space, sensitivity to motion and shock, time and costs. Operating costs to produce a single master can be relatively expensive.

As an alternative to the photoresist mastering system another technique, known as a non-photo resist (NPAR), or direct offset method, utilizes what is referred to as a dry process formula (DPF). This process incorporates the use of a material which undergoes ablation when exposed to a laser, thereby, forming the desired pit. This process has further brought forth a number of advantages over the photoresist process. These advantages include a reduction in the process steps by culminating, among others, developing and curing steps, which results in a less costly procedure and much shorter completion time, and the ability to monitor the quality of the disc concurrent with the mastering process of recording data thereon. The plate and DPF material are set upon a turntable for mastering and concomitant analysis. Metalization of the pitted layer is conducted to complete the mastering process. Once such a master is made, conventional electroplating and replication processes are accomplished to make a stamper which is then used for mass duplication of OD's by conventional injection molding processes. The NPR system makes some improvement over the prior art largely due to eliminating etching processing and oven-curing but it does not eliminate motion sensitivity nor the need for expensive and complex translator mechanisms and the glass reconditioning processes. Capital expense for such systems is still substantial, and the cost to produce a single master is still relatively expensive.

Yet another mastering process is referred to as a direct metal mastering (DMM) process. In the DMM process, instead of using a laser to either expose or cause ablation of the surface material, a tiny diamond stylus actually engages the surface, usually metal, and gouges the pits. Although technically feasible, this concept has had no meaningful application in industry because the "no contact" laser systems offer inherent increased reliability, longevity and efficiency over mechanical systems.

A major objective in recording optical disc masters is to control the geometry of the pits used to record data on the disc. Poor pit geometry makes the separation of duplicate discs from the disc stampers difficult. Also, data transmission can be affected by pits having raised areas surrounding the pit called berms, which are a common result in the dry process formula (DPF). An ideal pit is one formed with a complementary surrounding area. Much modern research and development has been devoted to creating recorded optical discs having ideal pit shapes. However, some of the conventional techniques, discussed above, have not developed a manner of recording optical discs without generating the variable berm areas surrounding the pits used to record data.

Applicant's earlier invention covered under U.S. Pat. No. 5,283,159 addressed improved pit formation and the berm build up problem in optical disc mastering by application of a semi transparent, very thin, metallic, thermo conductive layer for dissipation of heat accumulation around a pit at the moment of pit creation. With less heat build up and concentration around a pit, there tended to be less berm variability; however, even with heat dissipation, there remains some variability in berm build up surrounding each pit that needs improved uniformity to achieve universal readability and playability on subsequent replicated optical discs.

As can be seen from the foregoing discussion, the prior art possesses inherent limitations, and there continues to be a long standing need for a more efficient, less time consuming, and less expensive method for manufacture of an OD Master, that is effective in accurately controlling pit geometry for increased readability and playability. The invention disclosed herein does just that.

SUMMARY OF THE INVENTION

The invention is a method and apparatus useful in recording data on and in the manufacture of optical discs, wherein, laser tracking is improved and pits, used to record data, have their geometry and berm buildup controlled in a simple, effective and inexpensive manner. The invention utilizes an optically transparent (either polycarbonate or glass) disc substrate having an optical tracking groove molded or etched on a side, thereof. While in a cleanroom environment, a very thin layer (on the order of 30 to 50 Angstroms) of a substrate having different optical characteristics from that of the disc substrate is applied to the grooved side of the substrate, such that partial reflectivity is obtained. An optically active lamina is then spin coated on top the partially reflective layer. The active lamina is encoded with data by laser means configured to focus a data modulated beam along the tracking groove causing ablation and/or consumption of the optically active lamina. The partially reflective layer has an index of refraction that is different from either the disc substrate or the optically active lamina, which both have a similar index of refraction. Thus, a laser can more effectively track the junction area between the optically transparent disc substrate and optically active lamina layer due to the optical feedback received from partially reflective layer.

The desired pit size and geometry is achieved by selecting the laser power in conjunction with the thickness of the partially reflective layer. The partially reflective layer affects the characteristics of the exothermic reaction when the optically active lamina is subjected to a focused laser. While the laser is focused on optically active lamina creating heat, the partially reflective layer will also be focused on by the laser, and will cause additional heat to be generated. These effects have shown in related tests to result in a pit geometry that is virtually ideal.

An ideal pit is one that has limited variability in berms or raised areas immediately surrounding the pit. The cause of these berms is not positively known, although is thought that these berm raised areas are caused by a failure to ablate all of optically active lamina from the circumferential portions of desired pit area or due to heat build up around the periphery of each pit. In this invention, an additional step of Ultra Violet (UV) Curing of the reactive layer is utilized. After data is recorded, I.e. after pit creation, the reactive layer is subjected to one or more passes under or through a high intensity UV light. The UV curing step tends to level out if not totally eradicate the undesirable berm typically associated with laser pit formation.

OBJECTS OF THE INVENTION

It is an object of the invention to make a simple, effective and economical method of controlling the size and shape of the pits formed on optical discs to record data.

It is a primary object of the invention to substantially attenuate, flatten, and totally eliminate berm buildup surrounding recorded pits of information.

Another object of he invention is to provide a fast and inexpensive method of recording data in a controlled manner on optical discs.

Another object of the invention is to disclose an OD Mastering system capable of improved pit geometry and increased laser tracking that uses commercially available optical head, laser means and optically transparent substrate to avoid the need for expensive capital equipment found in prior OD Mastering systems.

Another object of the invention is to provide improved pit formation on optical discs by increasing the tracking and focusing potential for disc substrates such that a data modulated laser beam may accurately be focused upon and radiate from either side of the disc and cause improved consumption, ablation and sublimation of the optically active layer.]

Yet another object of the invention is to lower operating expenses encountered in producing an optical disc recording or an OD Master having ideal pit geometry's and increased laser tracking.

It is still a further object of the invention to create an optical disc, used for optical disc mastering, that is easier to manufacture and track upon, and that can be recorded upon and read from either side of the disc.

These and further objects of the invention will become more readily apparent and obvious in view of the attached drawing, and description of a preferred embodiment, in light of the appended claims.

BRIEF DESCRIPTION OF THE DRAWINGS

FIG. 10 illustrates in detail the entire optical disc mastering system including the UV curing step of the present invention as follows:

DETAILED DESCRIPTION OF THE PREFERRED EMBODIMENT

The following description is provided in order to enable any person skilled in the arts of optical disc mastering and optical disc recordings to make and use the invention, and sets forth the best modes contemplated by the inventors for carrying out the invention. The invention as disclosed, herein, can be used with a variety of embodiments. There are three categories that determine the various embodiments that can possibly be used with the invention. The first category concerns optical tracking paths. The present invention can be embodied on optical recording disc substrates with a raised optical tracking path as well as those that are flat and without any tracking path. The specific embodiments necessary for systems that record optical disc masters using discs substrates having an optical tracking path differ from those systems that record on disc substrates with no optical tracking path. The second category relates to recording data on either a first surface or a second surface of the optical disc. Here, the present invention is useful in systems that focus a laser directly on the first surface upon which laser light is incident as well as for systems that focus laser light through the disc on the second surface to record data. The third category relates to systems employing a glass disc substrate versus those that employ a plastic disc substrate. Again, the invention is useful in embodiments employing either a glass or plastic substrate. The various combinations of these three categories yields eight (8) types of embodiments that are possible with the present invention. Only those embodiments most preferred by the inventors shall be discussed herein. However, it should be readily apparent that the invention applies to optical recording systems within each of the eight categories, and that various modifications of the specific embodiments disclosed herein will be obvious to those skilled in the above referenced arts, since the principles applied by the present are generic to all eight types of embodiments.

Figure 1:
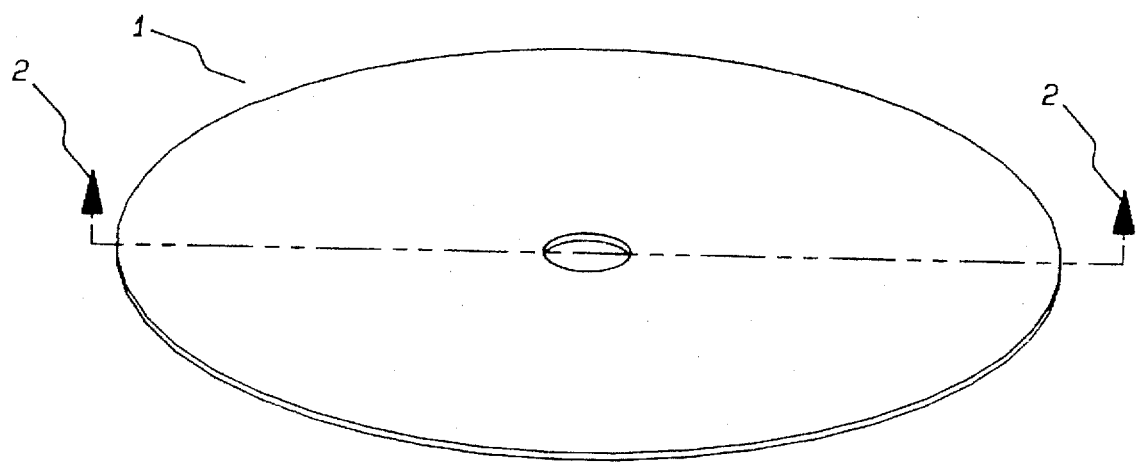
FIG. 1 illustrates an isometric view of a typical disc as used in the invention.
Figure 2:
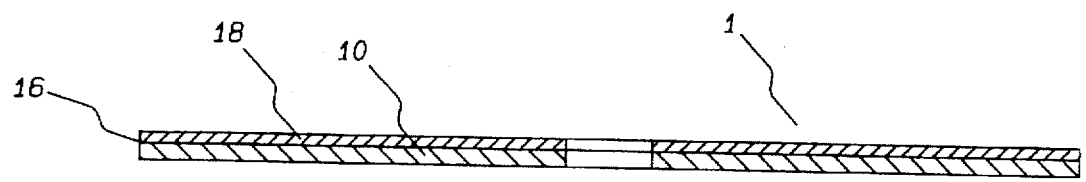
FIG. 2 is a cross sectional view of the disc shown in FIG. 1 along the diameter.

Referring now to FIG. 1, an illustration of disc 1 is typical of an unrecorded optical disc manufactured according to the concepts of the present invention. FIG. 2 illustrates a cross-sectional view of disc 1 as seen in FIG. 1 along the plane defined by the diameter and displays the various layers on disc 1 that constitute the present invention. In one embodiment, a partially reflective layer 16 is deposited on top of disc substrate 10 on the surface of disc 1 used to record data. Immediately on top of partially reflective layer 16, an optically active layer 18 is formed to record data within. The novel placement of partially reflective layer 16 is an essential feature of one embodiment of the invention since it provides increased reflectance useful in laser tracking. Additionally, it has been discovered that partially reflective layer 16 provides a means of controlling the geometry of the pits used to record data within optically active lamina 18. An alternate, second embodiment, however, utilizes no reflective, thermo conductive layer whatsoever.

Partially reflective layer 16 is formed by taking a material that is normally considered opaque and applying such an extremely thin layer on to disc substrate 10 that partially reflective 16 reflects and absorbs only a very small percentage of incident light. The extreme thinness of partially reflective layer 16 is also an essential part of the present invention. By applying partially reflective layer 16 in a layer having a thickness measured in tens of angstroms, most of the incident light can pass through partially reflective layer 16. However, a small percentage, on the order of one percent, of the incident light will be reflected or absorbed.

Optically active lamina 18 is used to store data on optical disc 1 as pits formed within optically active lamina 18 as a result of irradiation from laser light. The use of an optically active lamina to store data in an optical disc is well known to art of optical disc mastering. One feature of the present invention is the use of partially reflective layer 16 to improve laser tracking and control of pit geometry. The presence of partially reflective layer 16 assists to improve laser tracking and control of pit geometry. The presence of partially reflective layer 16 provides an additional junction for laser beam focusing; a useful feature in both read and write modes. By having light pass through mediums of differing refractive indices, a reflection of the incident light occurs at each junction. Thus, light passing through substrate 10 will have a partial reflection at the junction with reflective layer 16, and vice versa. Likewise light passing through partially reflective layer 16 will have a partial reflection at the junction with optically active lamina 18, and vice versa. Furthermore, the presence of partially reflective layer 16 assists in the formation of pits within optically active lamina 18 that are ideal in shape, having little or no raised areas surrounding the pit, but instead, have virtually all of optically active lamina 18 removed from the pit target area by a combination of ablation, consumption and/or sublimation. These ideal pit shapes are especially useful in mass production of duplicate optical discs from the resulting optical disc master due to the attenuation if not total elimination of the raised "berm" areas surrounding the pits which would otherwise cause complications in the manufacturing process.

Figure 5:
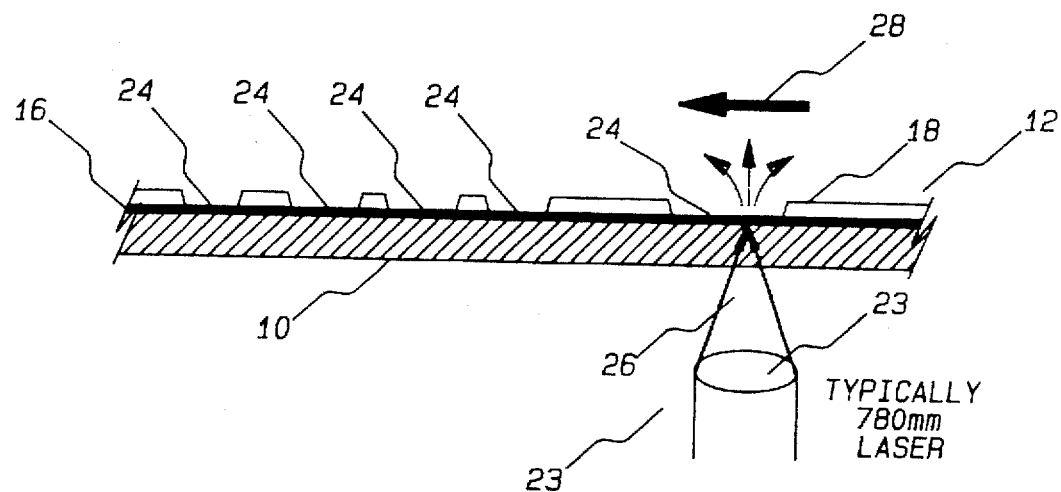
FIG. 5 illustrates the system used to record data on optical discs as envisioned within a first embodiment of the invention by recording through the transparent disc substrate from below the spinning disc.

Disc substrate 10 can have either an optical tracking path molded in, etched on the writing surface or may simply be a flat/planar disc depending on the specific embodiment. Disc substrate can be either transparent polycarbonate, a transparent polymethylmethacrylate (PMMA) or any other transparent substrate capable of carrying a tracking path. Glass would suffice for those embodiments employing an optical tracking path. Transparency of disc 10 is not an essential ingredient to the present invention in those embodiments where recording is accomplished by focusing a laser on the first surface of the disc to record data. Conventional mastering techniques used in the optical disc industry write to optical disc surfaces without focusing through the disc substrates. The present invention is equally useful for those conventional systems as well as embodiments where the laser focuses through transparent disc 10 and reflective layer 16, and onto reactive layer 18 as illustrated in FIG. 5.

Figure 3:
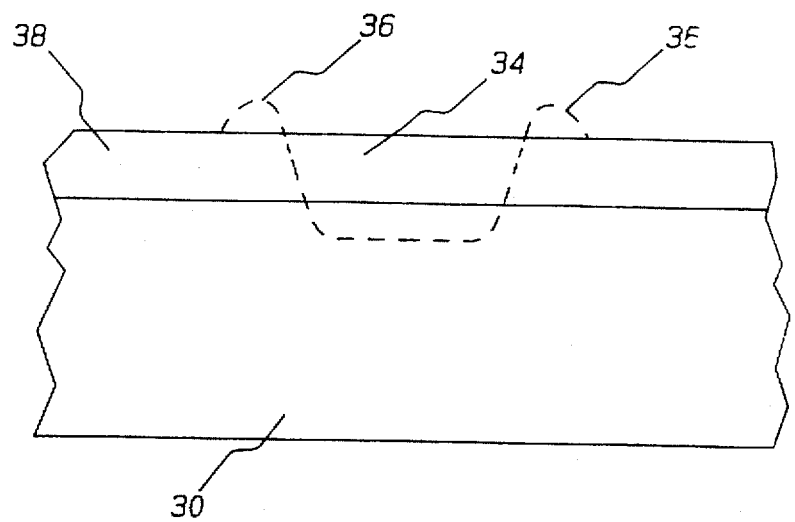
FIG. 3 illustrates resulting berm build up in pits used to record data on optical discs as created using conventional methods without any metallic, semi reflective, thermo conductive layer.
Figure 3A:
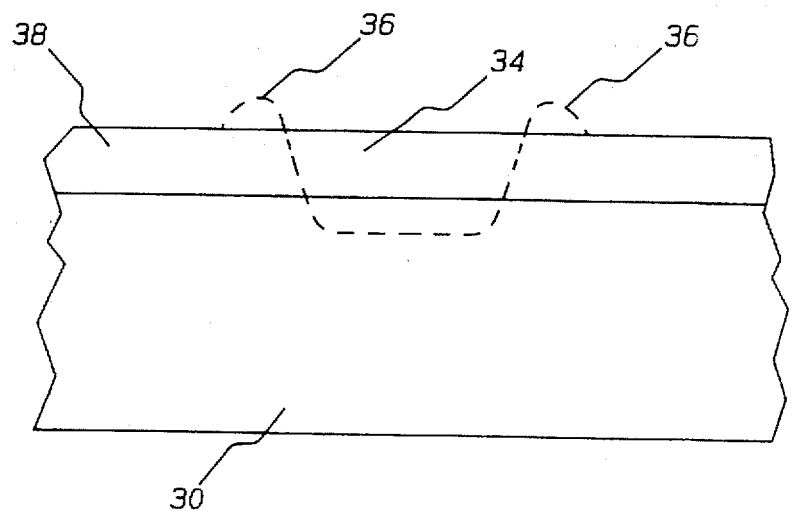
FIG. 3a illustrates the FIG. 3 pit profile indicating elimination of berms after the UV irradiation and curing step/ process of this invention.

Referring now to FIG. 3, a diagram of pits created using conventional disc mastering techniques employing optical disc 30 substrate having an optically active lamina 38 applied to the disc surface. The pits 34, indicated by the dotted line, that result from laser irradiation of optically active lamina 38 have berms 36 surrounding the pit 34. These berms result in undesirable problems in laser tracking and especially in reproducing the recorded disc that has these defects. Berms in a master disc create a situation where it is difficult to separate the duplicate copies from a mold, which in turn makes mass production difficult.

Figure 4:
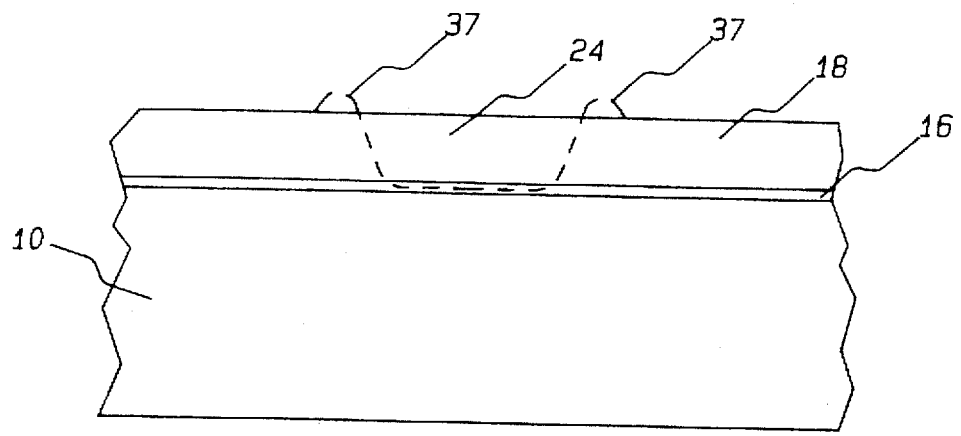
FIG. 4 illustrates resulting residual berm build up in pits created using conventional methods with a very thin metallic, thermo conductive layer.
Figure 4A:
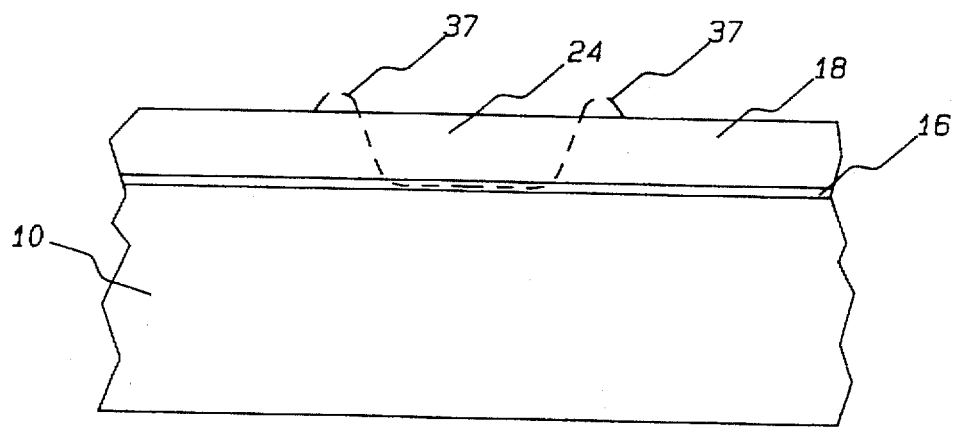
FIG. 4a illustrates the FIG. 4 pit profile indicating elimination of berms after the UV irradiation and curing step/ process of this invention.

One method as seen in FIG. 4 employs a partially reflective layer 16 to create pits 24, indicated by the dotted line, within optically active lamina 18 with nominal berms 37, in what is widely considered throughout the industry as a preferred pit shape. The only difference in the structure of this disc compared to conventional mastering techniques discussed above, is the presence of partially reflective layer 16. Furthermore, it is believed that heat generated within optically active lamina 18 is not directly absorbed within disc substrate 10, because partially reflective layer 16 acts as a heat barrier preventing that heat generated from escaping into disc substrate 10. However, even with the addition of reflective, heat conductive layer 16, the ablative thermal process of creating pits 24 still tends to create a residual berm 37 along the pit edge.

Therefor, the additional step and process of the present invention was conceived to further attenuate and effectively totally eliminate the undesirable berm build up in pit formation with or without any metallic, thermo conductive layer disposed therein. The necessary and additional step of this invention includes irradiating the active layer with ultra violet (UV) light after the data pits are recorded by laser means in the active layer and before addition or application of any subsequent layer such as the vapor deposition of Silver or Nickel to effectively complete the disc master process.

The UV irradiating and reflowing process is performed by passing the recently recorded disc with the exposed active layer face up, i.e. facing the UV illumination, and lying on a conveyer belt that will carry the disc under or through a UV light for one or more passes. The UV irradiating and reflowing process can be performed by application of a Porta Cure Model 1000F at 120V and 230V or a Porta Cure Portable Mini that can be purchased from American Ultraviolet of Santa Ana, Calif. The Mini model utilizes a portable mini UV source at 185 to 400 nanometer UV wavelength with a bulb length of 6 inches and power of 200 watts per linear inch yielding a 30 inch arc length at the disc surface. The disc is carried by a conveyer belt moving at 10 feet per minute and at a distance of approximately 5 inches under the UV light. At this power and settings, it is necessary to make 4 to 5 passes of the disc under the UV source while turning the disc one quarter turn on each successive pass to effectively reach a required "transition point" to sufficiently soften but not totally melt the surface of the active layer and thereby lower and totally eliminate the berm build up. Not reaching the transition point will not soften the active layer sufficiently enough to eliminate the berm, and going past the transition point will melt the active layer sufficiently enough to destroy the pit entirely.

Briefly, the novel improvement and process of the invention disclosed herein dictates an additional step to the existing optical disc mastering process. That step includes irradiating the recently recorded active layer with UV illumination before any additional layer is applied to the disc. The UV irradiating and reflowing process sufficiently softens the active surface to somewhat "melt" the berm without melting the active layer. Melting would destroy the pits already formed. In melting the berm, the berm diminishes in size and height and flattens out to effectively disappear.

Once data is fully recorded on the disc and the foregoing UV irradiating and reflowing process has been implemented, the OD Master is completed by the last step of vacuum deposition, or other equivalent process, wherein a thin layer, approximately 1000 angstroms (Å), of an electrically conductive and optically reflective lamina 16, is placed on the disc. In the preferred embodiment the lamina 30 is silver (Ag). Upon completion of the metalization process step, the resultant OD Master can then be electroplated by conventional means to form a stamper for replication of many identical discs.

First Embodiment

The first preferred embodiment of the invention as shown in FIG. 5, illustrates data recording by means of a disc spinning above an optical head 22 with laser beam 26 passing through disc substrate 10, which in this embodiment is a transparent polycarbonate material, to irradiate upon the optically active lamina 18. This orientation is a second surface type of orientation that is typically used in reading prerecorded Compact Discs (CDs), and reading and writing with Write Once Read Many (WORM) discs. However, the present invention writes to optical discs in a novel manner which can then be used in making a first article master disc for CD's. Conventionally, first article master discs are created by focusing a laser on the first surface of the optical disc rather than focusing a laser through the disc to write on the second surface.

Figure 6:
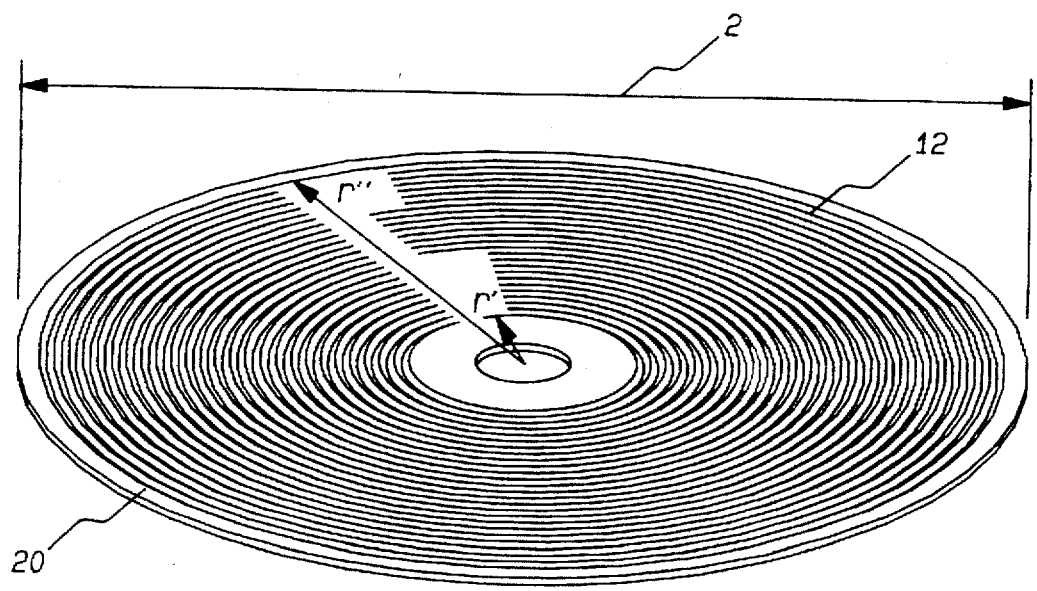
FIG. 6 illustrates a disc used in accordance with the first preferred embodiment of the invention.

The embodiment shown in FIG. 5 employs a disc as shown in FIG. 6 that has tracking path 12 created upon the writing surface 20 of polycarbonate disc substrate 10. Partially reflective layer 16 is made from tellurium, gold or any other substance having the proper characteristics of partial reflectivity. Optically active lamina 18 is made from a nitrocellulose material containing an optically active dye compound. Without the dye the nitrocellulose is optically transparent. Here, the invention has many advantages. Partially reflective layer 16 allows for significantly improved tracking and focusing on the junction area between the disc substrate 10 and optically active lamina 18. Optical head 22 focuses laser 26 on partially reflective layer 16 and optically active lamina 18 causing the absorption of energy and a corresponding generation of heat. Conventional techniques rely on dye within optically active lamina to generate heat and as a result pits generated using these conventional methods have raised berm areas surrounding the pits. However, the present invention uses partially reflective layer 16 as well as the dye within optically active lamina 18 to generate the heat used to create pits 24 that are ideal in shape, having no raised berm areas.

Optical head 22 situated below disc substrate 10, causes laser beam 26 to pass through disc substrate 10, and finely focus on the junction area between partially reflective layer 16 and optically active lamina 18. The nitrocellulose dye compound in optically active lamina 18 and the tellurium in partially reflective layer 16 reflect and absorb laser light resulting in the production of substantial heat energy in both reflective layer 16 and optically active lamina 18 which in turn generates a rapid chemical reaction in optically active lamina 18 which is thereby consumed, ablated and sublimated to form pits 24. Optical head 22 is tangentially stationary, yet tracking path 12 indicated by arrow 28, is moving relative to optical head 22, in FIG. 6b, enabling a series of data to be recorded thereon. Optical head 22 moves radically outward in a straight line from the center to the periphery of disc 10, while tracking spiral tracking path 12 and disc 10 spins at a steadily declining rate to maintain a constant linear velocity (CLV) of approximately 1.2 meters per second for a point on the surface of the disc that is being irradiated by laser focused laser light 26.

Figure 7:
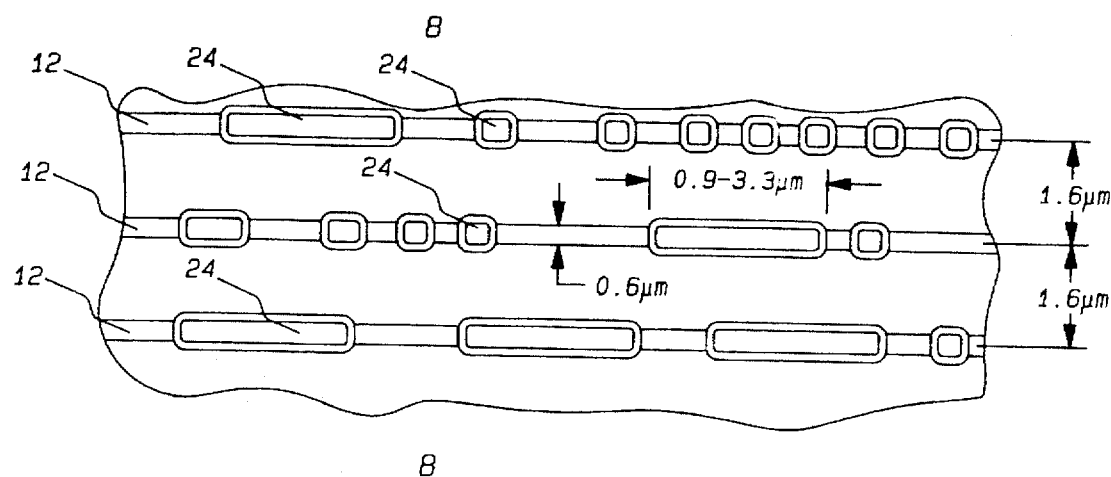
FIG. 7 is a top view illustrating recorded pits within the optically active lamina of an optical disc.

FIG. 7 illustrates a top view of data recorded along tracking path 12 as indicated by ablated pits 24 which typically are ¼ of a laser wavelength deep, 0.7 um wide and 0.9 to 3.3 um long. The variance in length represents data recorded in CD format as channel bits in lengths commonly termed 3T to 11T, which represents the run length limited (RLL) code of recorded data. For tracking purposes of a typical 780 nanometer (nm) wavelength laser it is desirable that the resulting groove 11 be in the realm of ⅛ of a laser wavelength or 975 Å (Actually groove 11 would be 650 Å, 975/1.5=650 when the difference of index of refraction (1.5) is taken into account).

Figure 8A:
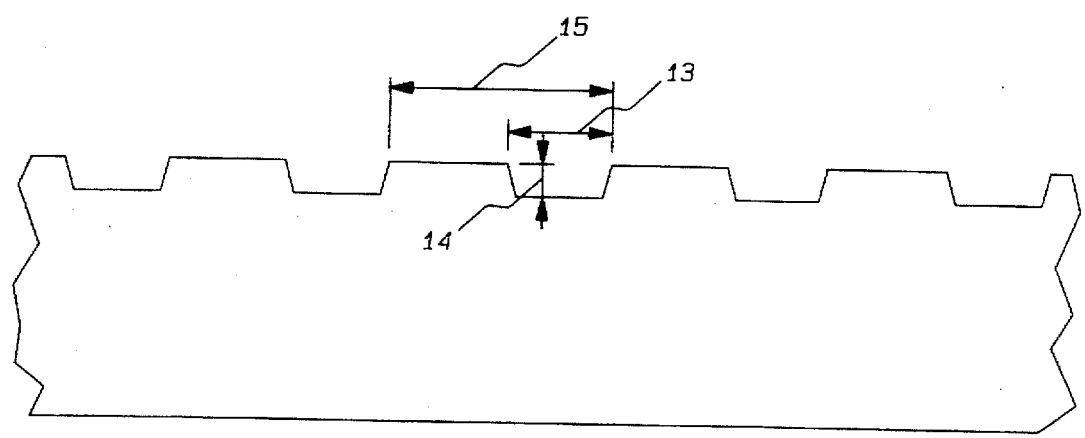
FIG. 8a illustrates an exploded cross section of the unrecorded polymer disc of FIG. 1 having an optical tracking path as used with the present invention.

FIG. 8a is a magnified view of a cross sectional area of the disc 1 displaying tracking path 12 in sufficient detail to discuss the relationship between the geometry of tracking path 12 and the creation of pits 24 used to record data. The dimensions of tracking path 12 and the resulting pit 24 are nominally as indicated in FIG. 8a discounting the possibility of any nominal residual reactive lamina not ablated. Preferably, although not necessarily limited thereto, tracking path 12 has width 13 equal to 0.78 um, depth 14 being equal to 0.076 um and track pitch 15, i.e. the distance (including the "land" 38) between successive tracks or grooves, equal to 1.6 um. For a 780 nm laser, these tracking dimensions will yield a pit approximately ¼ of a laser wavelength deep.

Figure 8B:
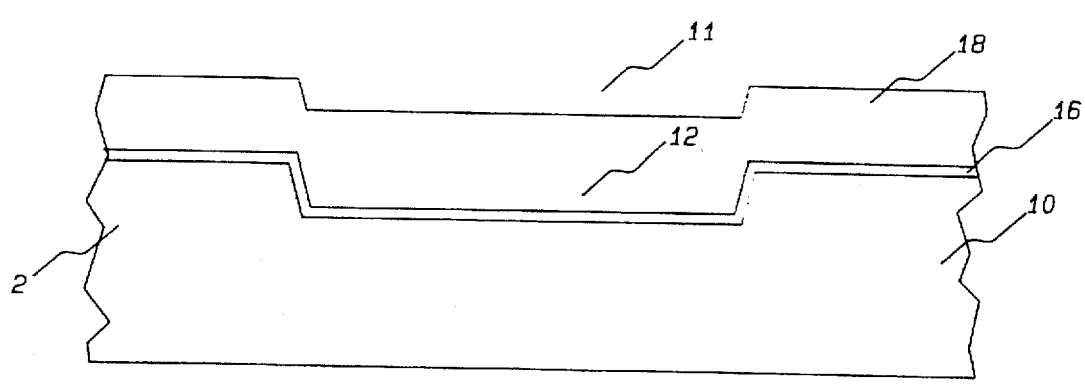
FIG. 8b is an exploded view of a grooved area of FIG. 2 displaying the layers used in the invention.

Referring to FIG. 8b, a very thin (on the order of 25 to 50 Å) partially reflective layer 16 is applied to the grooved surface of the disc upon which tracking path 12 is delineated by any of the conventional techniques capable of applying such a thin layer: sputtering technique; thermal deposition; electron beam; or chemical deposition. Immediately above reflective layer 16 is placed an optically active layer 18, approximately 130 nm to 140 nm thick, consisting of a nitrocellulose compound having a dye solution sensitive to the recording laser's wavelength.

Partially reflective layer 16 has a different index of refraction from either disc substrate 10 or optically active lamina 18. This difference in the index of refraction results in reflection which significantly increases the signal to noise ratio achieved in laser tracking of tracking path 12. The materials used in forming partially reflective layer 16 are normally considered opaque in greater thicknesses. However, the extreme thinness of partially reflective layer 16 results in partial optical transparency. Many substances can be used to create the partially reflective layer. Optimum results have been achieved, so far, by creating the partially reflective layer 16 from tellurium, or gold, although, other minerals or metals could be employed as reflective layer 16. The novelty of the present invention is not the particular element used as reflective layer 16, inasmuch as the location and thinness of partially reflective layer 16.

Referring now to FIG. 8A in conjunction with FIG. 8B, the geometry and dimensions of pits 24 formed on grooved surface 2 imprinted on disc 10 can be formed to approach the shape of tracking path 12. The dimensions of tracking path 12 can be determined by various means customary in the art, including, mechanical/physical etching, photo resist etching and even continuous ablation of a laser by means of a continuous wave (CW) laser beam. Predictable results are obtained by operating within the confines of the tracking path 12 to create pits 24. Usage of optical tracking path 12 assists in obtaining the desired path and pitch for recorded data. The control of pit geometry results from conjunctive variance of the thickness of partially reflective layer 16 and optically active lamina 18 with laser power focus and wavelength. By having a laser focus on the area defined by partially reflective layer 16 and optically active lamina 18, heat is generated consistently throughout the target area. The affect is that none or very little of optically active lamina 18 remains within the area of tracking path 12 that has been subjected to laser irradiation. Pit formation leaves only the grooved walls 20 or a nominal residual layer of optically active lamina 18, with essentially no surrounding berm area, yielding pits that are ideal to shape.

The optical laser head 22 used in the foregoing process is preferably a 780 nm wavelength laser, although another wavelength laser could be used, mounted in an optical head which has a single spot tracking capability. It should be understood that different laser wavelengths would dictate different groove and pit geometry. The optical head 22 has a lens 23 with a numerical aperture of 0.6 such that the laser may be focused to a spot on tracking path 12 which spot has a diameter approximately equal to the width 0.7 um of the groove when laser beam 26 passes through polymer substrate 10. Once lens 23 is focused, optical tracking path 12 provides a means by which optical laser head 22 can track on disc 10 and follow the spiral path necessary for optical disc encoding. The operating system utilizes conventional servo means to adjust the speed of spinning disc 10 to the radial translational movement of optical head 22 in such fashion that laser beam 26 is able to follow the spiral tracking path 12 with a constant linear velocity (CLV) from the inner most groove radius (r') to the outermost groove radius (r").

The laser diode used in the invention is a diode having sufficient power to ablate the optically active lamina. The diode during recording is modulated with the desired data stream and by such means forms the series of ablated pits 24 of various length aligned along tracking path 12.

Second Embodiment

Figure 9:
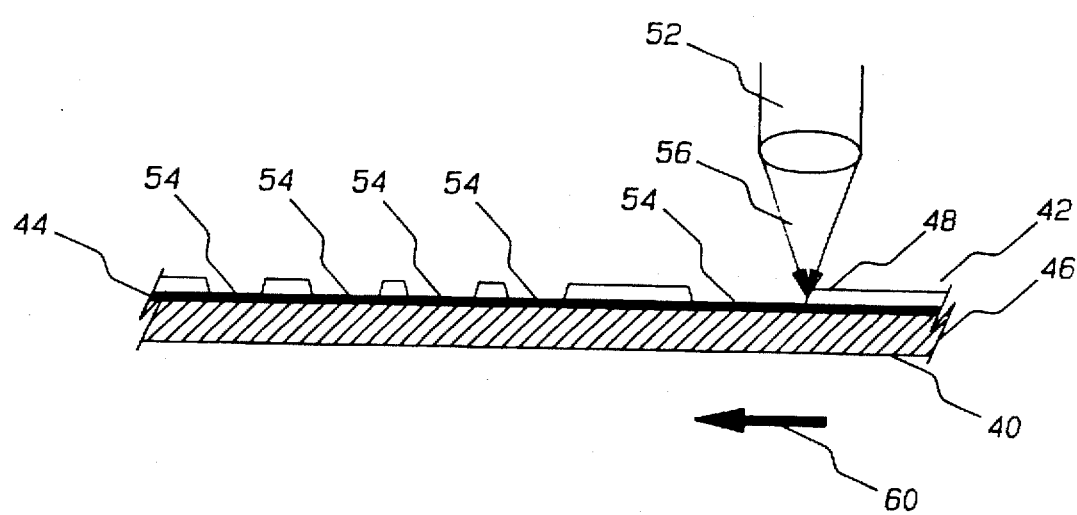
FIG. 9 illustrates the system used to record data on optical discs as envisioned within a second embodiment of the invention by recording on the active layer directly from above the spinning disc without passing through the transparent disc substrate.
Figure 10A:
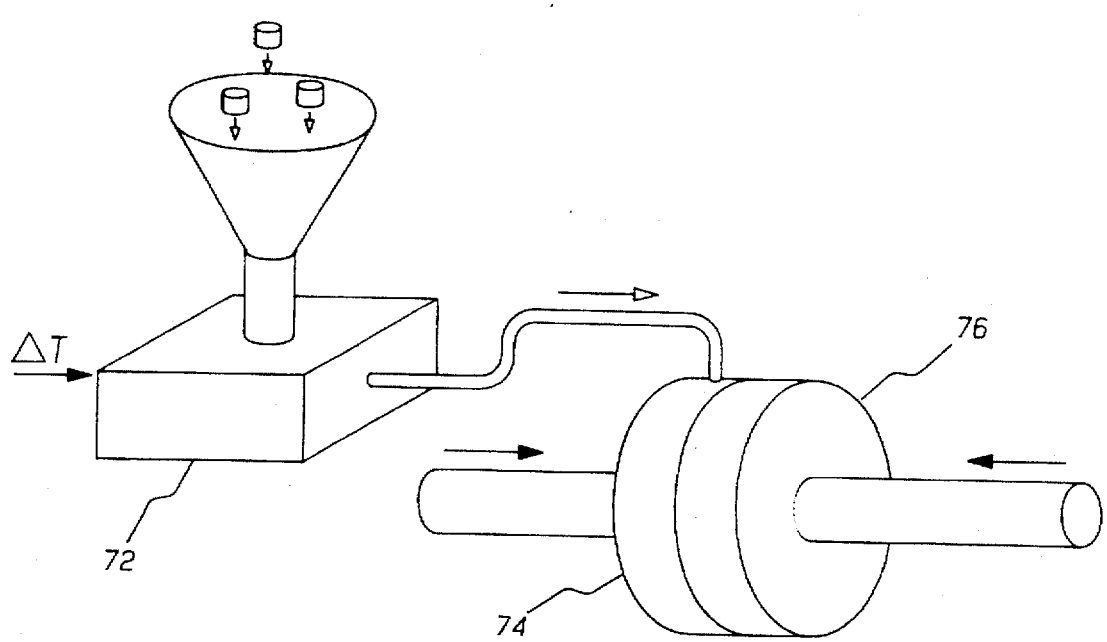
FIG. 10a step of compression molding transparent disc substrates.
Figure 10B:
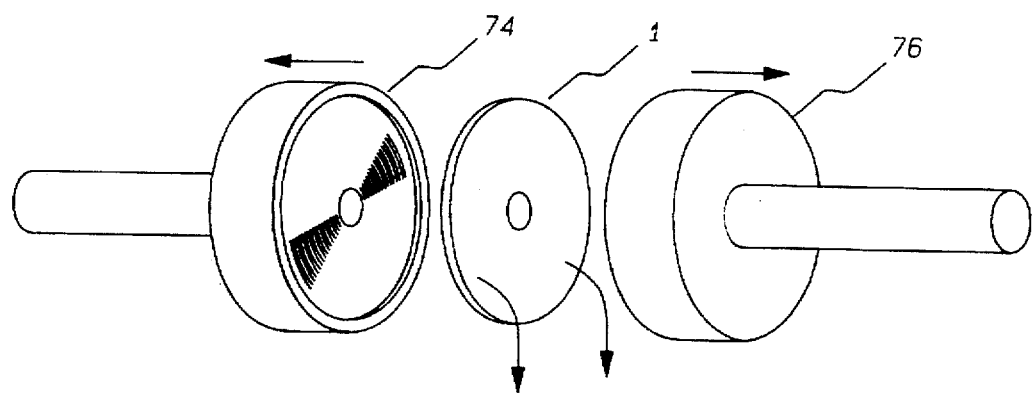
FIG. 10b step of separating mold to release disc substrate with embossed tracking groove.
Figure 10C:
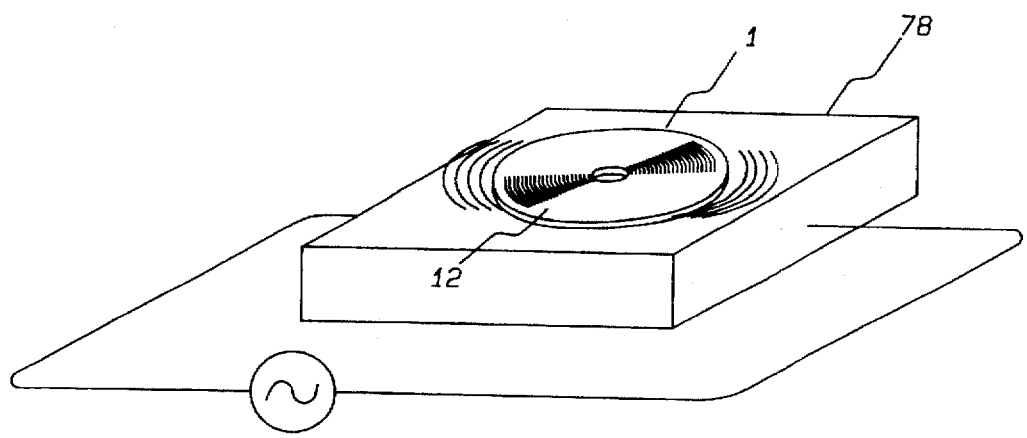
FIG. 10c step of clean room plasma process to agitate and remove impurities.
Figure 10D:
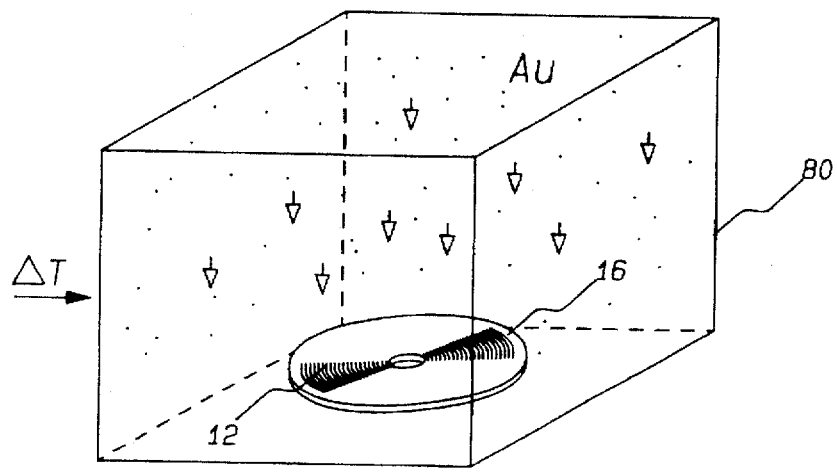
FIG. 10d step of step of vapor deposition of metallic, gold, semi reflective layer.
Figure 10E:
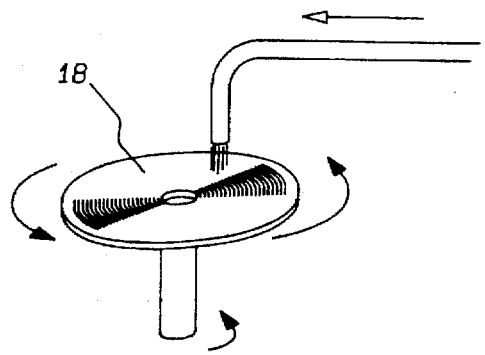
FIG. 10e step of spin coating optically active, nitrocellulose, layer.
Figure 10F:
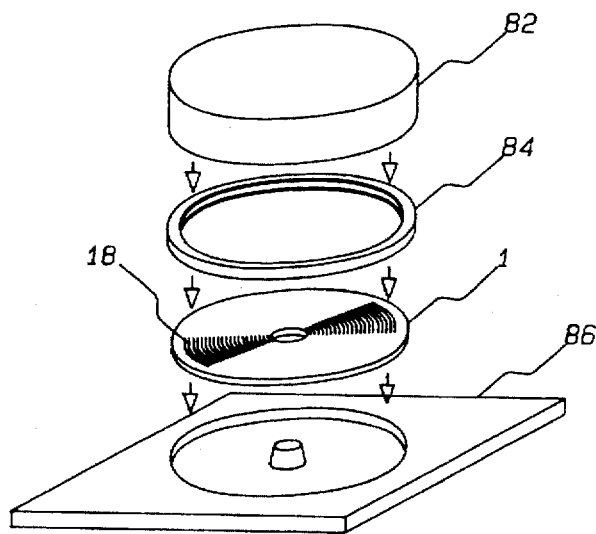
FIG. 10f step of applying a sealed cover to active side of disc.
Figure 10G:
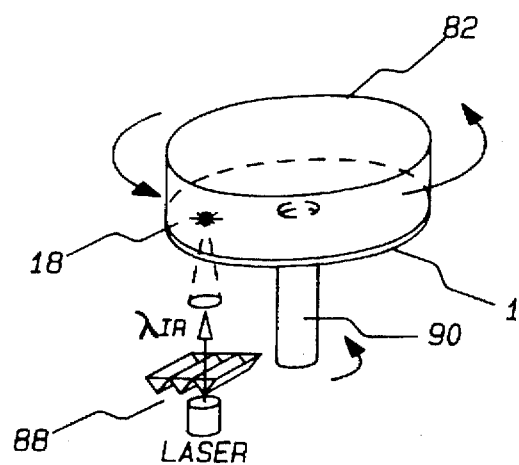
FIG. 10g step of recording data by laser means under the spinning disc.
Figure 10H:
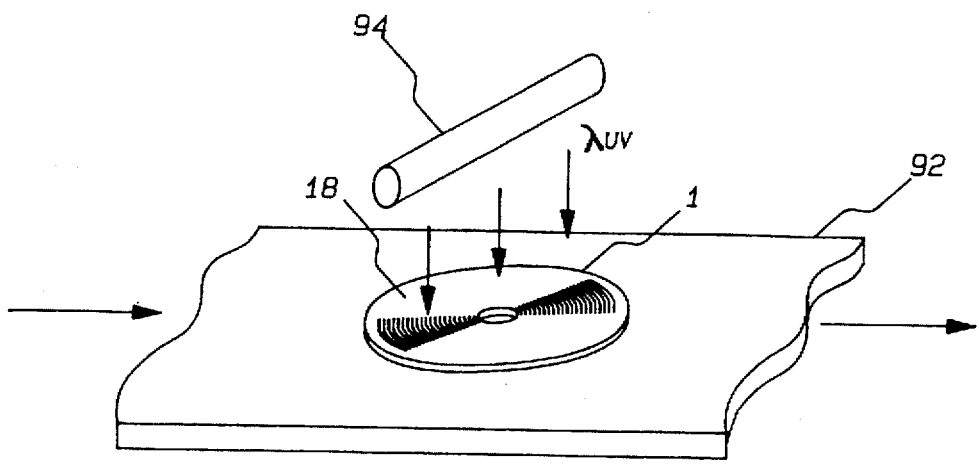
FIG. 10h step of UV curing recorded pits to remove or eliminate excessive berms.
Figure 10I:
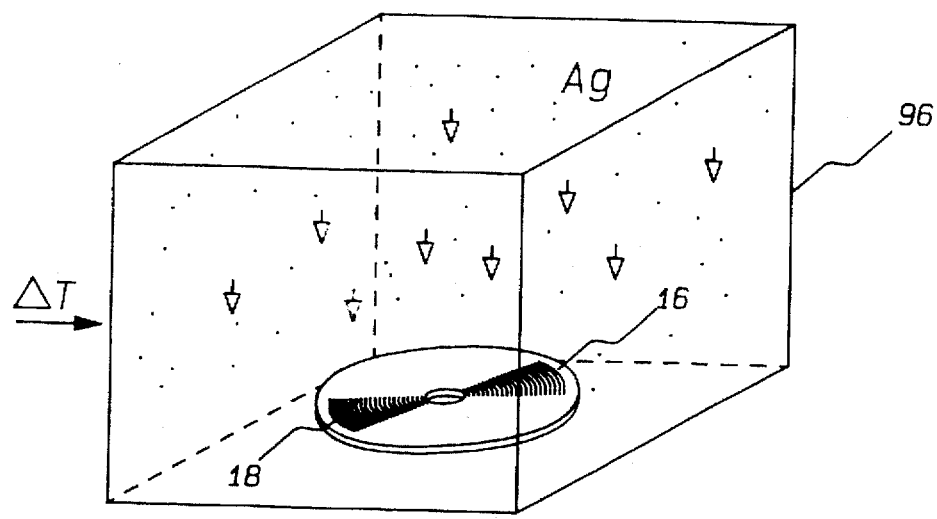
FIG. 10i step of vapor deposition of metallic, conductive, silver, layer to yield an OD master.
Figure 10J:
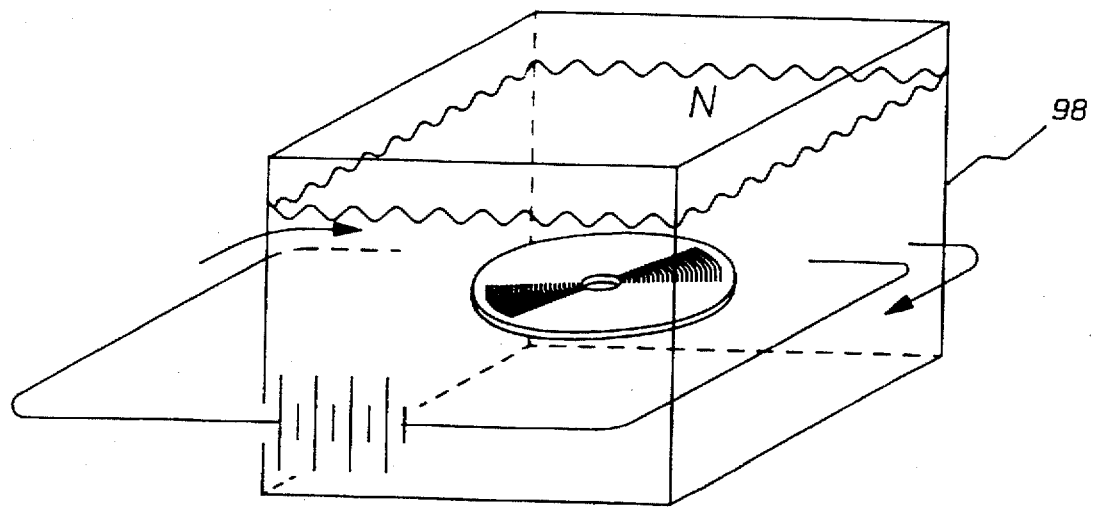
FIG. 10j step of electroplating a nickel layer to form a stamper for multi disc production.

The second preferred embodiment of the invention as shown in FIG. 9, illustrates data recording by means of a disc spinning below an optical head 52 with laser beam 56 focusing on optically active lamina 48 from above disc 40. This configuration is similar to those used in conventional disc mastering techniques, and similarly employs a disc substrate 40 made from highly polished glass, having one side used as a writing surface 44. A very thin, partially reflective layer 46 (on the order of 30–50 Angstroms) is deposited on surface 44, in accordance with the overall concept of the invention. Optically active lamina 48 is then deposited in a uniform layer on partially reflective layer 46. As can be seen there are similarities between this embodiment and the first embodiment in terms of the layers used to construct the disc. However, the second embodiment employs a glass disc substrate 40 with laser beam 56 focused from above disc 40 onto disc surface 44 where there is no optical tracking path. The second embodiment is, therefore, illustrative of the usefulness of the present invention in conventional systems used to make first surface master discs. By focusing a laser on the first surface of the optical disc rather than focusing through a disc, as in the previous embodiment, the invention is operative within these conventional systems.

As in the first embodiment, partially reflective layer 46 is preferably made from tellurium or gold, and optically active lamina 48 is made from nitrocellulose material containing a dye compound to make it optically active. Again, as in the first embodiment, partially reflective layer 46 allows for significantly improved tracking and focusing on the area including disc substrate 40 and optically active lamina 48. Optical head 52 focuses laser 56 on partially reflective layer 46 and optically active lamina 48 causing absorption of energy and a resulting generation of heat. Conventional techniques rely on dye within optically active lamina to generate heat. However, the present invention uses partially reflective layer 46 as well as the dye within optically active lamina 48 to generate the heat used to create pits 54.

The nitrocellulose dye compound in optically active lamina 48 and the tellurium in partially reflective layer 46 reflect and absorb laser light resulting in substantial heat energy in both reflective layer 16 and optically active lamina 48 which in turn generates a rapid chemical reaction within optically active lamina 48, which causes consumption, ablation and/or sublimation of optically active lamina 48 to form pits 54. As in the first embodiment, and in accordance with the principles of the invention, this head is distributed within the target area in a manner that results in pits 54 being formed that are without berms surrounding pits 54, in an ideal shape.

A major difference in this embodiment when compared to the first embodiment, is the fact that no optical tracking path exist on the unrecorded disc. The data is recorded in a pattern that can be used as a tracking path for reading of the recorded data by a read laser. To accomplish this, laser source 52 appears stationary to disc 40 during recording but actually moves radically outward in a straight line from the center to the periphery of disc 40 while disc 40 spins at a steadily declining rate to maintain a constant linear velocity (CLV) of approximately 1.2 meters per second for a point on the surface of the disc that is being radiated by laser beam 58. Pits 54 can be recorded in preferably a spiral manner.

In an effort to provide an overall summary of the foregoing processes, applicant encloses herewith a description for FIG. 10 which is a detailed visual step by step process for making an optical disc master in accord with the teachings of this patent. FIG. 10a illustrates a perspective view of the formation of the transparent disc substrate 10. Polycarbonate pellets 70 are melted in an oven 72 and forced under pressure into a compression mold consisting of a tracking grooved side 74 and a smooth, planar side 76. FIG. 10b indicates the opening of the compression mold to release a transparent, polycarbonate disc substrate 1. The disc substrate 1 in FIG. 10c is then passed through a plasma process 78 in a cleanroom environment where a high voltage plasma field agitates, loosens, and removes undesired molecules and in so doing lightly etches the grooved side of disc 1 and removes impurities from the disc in preparation for application of subsequent layers. In FIG. 10d, a metalization process 80 is then performed to yield a reflective, thermo conductive layer 16 whereby a very thin layer of gold (Au) is deposited by conventional vapor deposition or sputtering means over the entire grooved side 12 of the disc. In FIG. 10e, the photoreactive, nitrocellulose solution layer 18 is spin coated onto the grooved side 12 of disc 1 on top of the semitransparent metallic layer 16. FIG. 10f indicates an alternate embodiment or step in lieu of maintaining a clean room environment. In this step a disc cover 82 is applied to the active side 18 of disc 1 and removably sealed thereto by a rubber or plastic grommet 84. The sealed and protected disc is then placed in a protective carrying tray 86. FIG. 10g illustrates the laser recording process wherein data pits are recorded by a laser modulating an focusing means 88 in the active layer 18 sealed and enclosed in disc cover 82 while both disc an cover spin about a spindle 90. FIG. 10h illustrates the novel improvement delineated in this invention whereby the disc 1 with recorded and active side face up on a conveyer belt 92 moving from left to right under and through an ultra violet light 94 which irradiates the active surface 18 and thereby eliminates any residual berm build up. FIG. 10i concludes the disc mastering process by vapor deposition process 96 of an electrically conductive silver (Ag) layer. From this optical disc (OD) master an OD stamper is formed in FIG. 10j by passing the disc master through a Galvanic bath/chamber to create a family series by building a nickel layer through an electroforming process 98 to make a "father" having bumps instead of the disc master "mother" with pits.

Although the embodiment most preferred by the inventors for making optical disc recordings have been detailed here, it should be understood that the invention is not limited thereto, and that modifications to the invention as disclosed herein should be obvious to those skilled in the relevant arts. Therefore, these obvious modifications should be considered to be within the scope of the invention as defined in the appended claims.

What is claimed is:

1. A process for making an optical disc master, comprising the steps of:

forming a planar optical disc substrate having at least on surface for recording data;

applying a partially reflective lamina to said recording surface, said reflective lamina having a thickness of less than about 50 Angstroms, said partially reflective lamina being constructed from an opaque substance and applied in such an extremely thin manner that said partially reflective lamina is substantially transparent;

applying an optically active lamina to said partially reflective lamina;

writing data to said optically active lamina by focusing a laser to form a series of pits in said optically active lamina;

heating, softening, and reflowing said optically active lamina by illuminating said active lamina with ultra violet radiation from at least one portion of the electromagnetic spectrum and thereby substantially eliminating any raised, berm areas typically around said pits; and applying a conductive lamina to said reflowed active lamina to complete an optical disc master.

2. The process as defined by claim 1, wherein said step of writing data further consists of focusing a data modulated laser in an area defined by said partially reflective lamina in said optically active lamina.

3. The process as defined by claim 2, wherein said recording surface has an optical tracking path disposed thereon.

4. The process as defined by claim 3, wherein the step of writing data consists of focusing said laser on said optical tracking path to form said pits.

5. The process as defined by claim 4, wherein said substance used to create said partially reflective lamina is a mineral.

6. The process as defined by claim 5, wherein said substance used to create said partially reflective lamina is a metal.

7. The process as defined by claim 2, wherein said laser means is disposed to focus through said disc substrate to form pits in said optically active lamina.

8. The process as defined by claim 1, wherein said disc substrate is a polymer.

9. In an optical disc mastering process:
a—forming a transparent disc substrate;
b—applying a lamina of semi transparent, semi absorptive, and semi reflective substance to said disc substrate;
c—applying a lamina of an optically active substance to said transparent, absorptive, reflective lamina;
d—recording data by modulated laser means passing through said transparent substrate and through said transparent, absorptive, reflective lamina to said active lamina; and
e—applying a conductive lamina to said recorded, active lamina to complete a disc master, Wherein, the improvement comprises the addition of a new step (dd) between steps d and e above as follows:

dd—illuminating, radiating, softening, and reflowing said recorded, active lamina to flatten and eliminate berm buildup prior to application of a conductive lamina.

* * * * *